United States Patent
Clay

[15] 3,671,954
[45] June 20, 1972

[54] SLAMMING INDICATOR SYSTEM FOR MARINE DEVICES

[72] Inventor: John Armstrong Clay, Bowdon, England

[73] Assignee: Manchester Liners Limited, Port of Manchester, England

[22] Filed: March 13, 1970

[21] Appl. No.: 19,452

[30] Foreign Application Priority Data

March 15, 1969 Great Britain......................13,714/69

[52] U.S. Cl..................................340/240, 73/389, 73/406, 114/.5 R
[51] Int. Cl.......................................................G08b 23/00
[58] Field of Search....................340/236, 240, 244; 73/304, 73/389, 406, 148; 114/122, .5; 200/83

[56] References Cited

UNITED STATES PATENTS

| | | | |
|---|---|---|---|
| 1,398,792 | 11/1921 | Paulin | 200/83 |
| 2,695,585 | 11/1954 | Montrose-Oster | 114/122 |

*Primary Examiner*—John W. Caldwell
*Assistant Examiner*—Daniel Myer
*Attorney*—Shoemaker & Mattare

[57] ABSTRACT

In order to detect the existence of slamming conditions in ocean going vessels a slamming indicator is provided with monitors the water pressure beneath the forefoot of the vessel and which energizes an indicator according to such pressure.

15 Claims, 8 Drawing Figures

PATENTED JUN 20 1972 3,671,954

INVENTOR:
JOHN ARMSTRONG CLAY
BY
Shoemaker and Matlare
ATTYS.

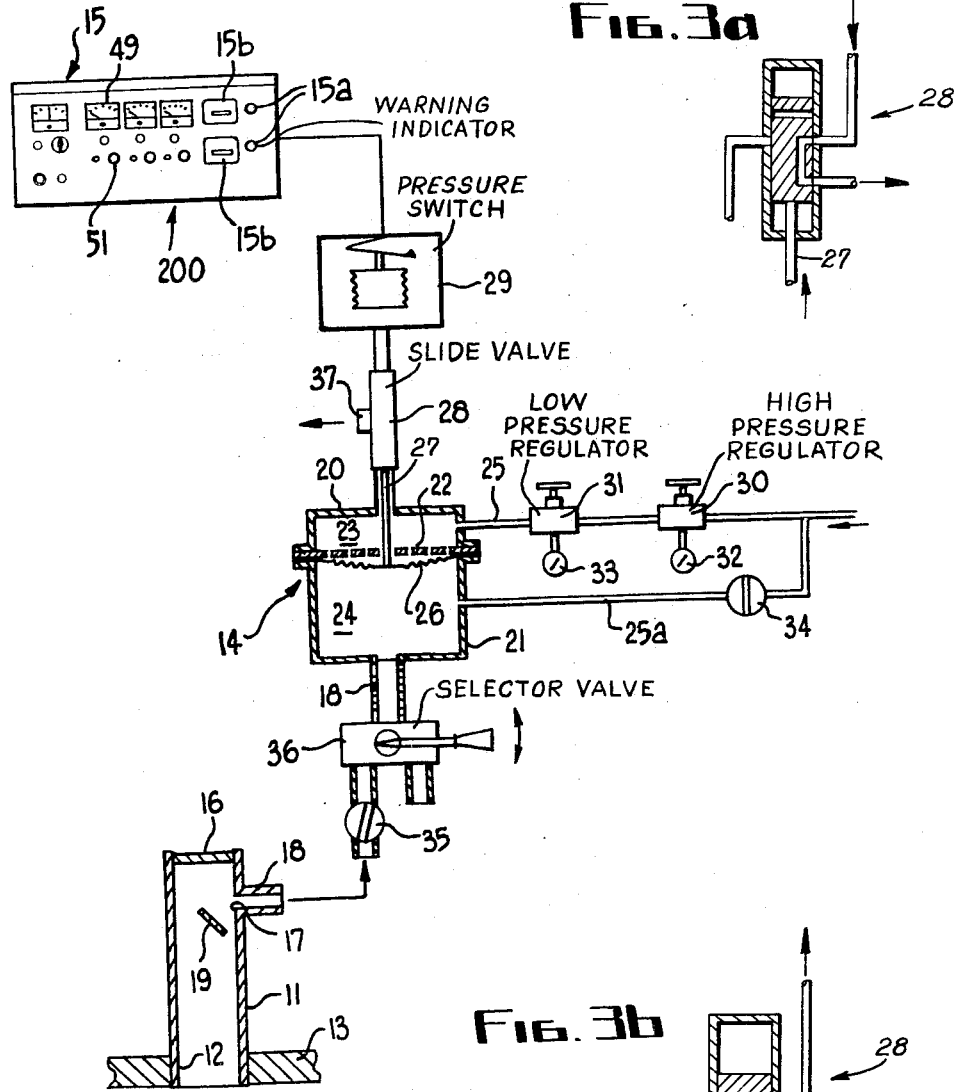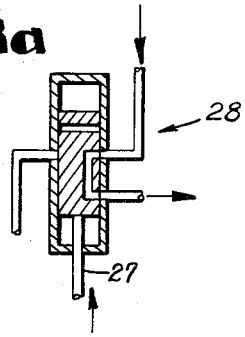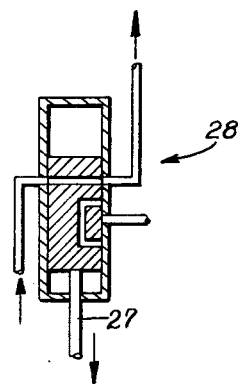

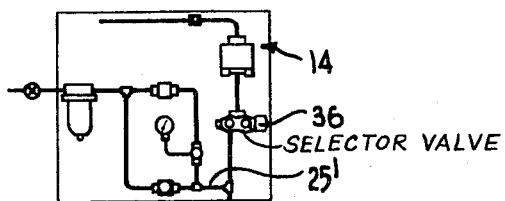
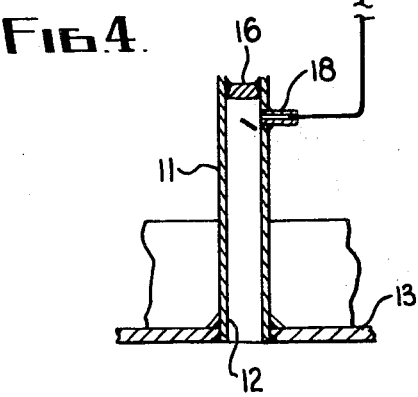
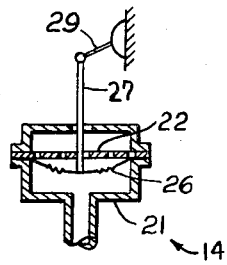
Fig.4.  Fig.4a.
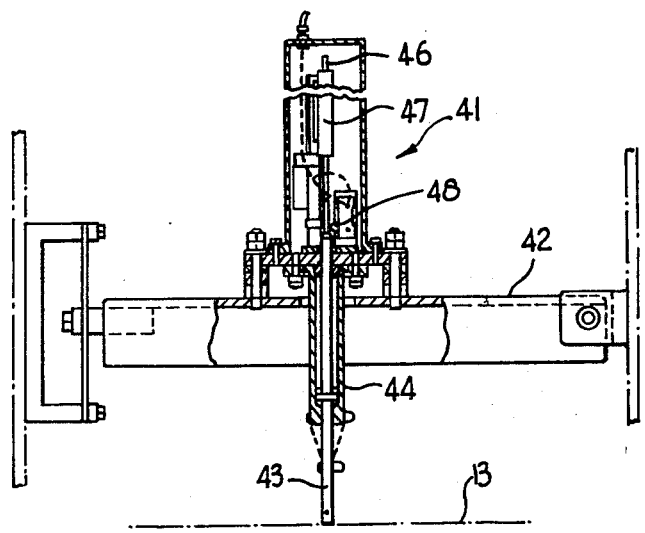
Fig.5.
INVENTOR:
John Armstrong Clay
BY
Shoemaker and Mattare
ATTYS.

SLAMMING INDICATOR SYSTEM FOR MARINE DEVICES

The invention concerns marine devices and has more particular reference to a means for detecting and for indicating the incidence of slamming in ships, especially ocean-going ships.

In severe head seas it is not unusual for the bow of a ship to lift from the water so as to expose the forward bottom plating of the hull, such plating being subjected to a heavy impact upon re-entry. In extreme cases the heavy impact can cause plastic deformation of the plating and sets of the order of one inch have been experienced.

Hithertofore, the onset of slamming has been audibly detectable on the bridge and it has therefor been possible for appropriate action, say a reduction in speed, to be taken before the slamming reaches such proportions as would cause severe damage to the plating. However, in present day ship design, particularly of container ships, the bridge is located aft and the length of the ship is such that no audible indication of slamming is apparent at the bridge.

The primary object of the present invention is to provide a means for detecting and for indicating that conditions appropriate to slamming exist.

According to the present invention a slamming indicator comprises a hollow body having an opening therein adapted to allow of a ready flow of water into and from the body, the said body being for mounting in a ships bottom at a position whereat slamming occurs and with the opening in sealed register with a through hole in the said bottom, and a pressure sensing means sensitive to air pressure within the body and above the water level therein, the said pressure sensing means being adapted to actuate an indicator according to the pressure sensed relative to a datum pressure.

Preferably, the pressure sensing means includes an element movably mounted within a chamber and subject to the air pressure within the said body, and a switch means adapted to be actuated by the said element according to the position thereof.

According to a further feature of the invention the body part includes a fixed stop to limit the extent of movement of the movably mounted element.

In one arrangement the switch means will comprise a pressure actuated electric switch arranged to operate when subjected to a datum pressure and the movable element will be adapted to connect the said pressure actuated electric switch with the datum pressure on movement of the movable element consequent upon a pressure reduction within the hollow body consistent with slamming.

In another arrangement the switch means will be held in an open condition by normal air pressure present in the space between the movable element and the free water surface within the stackpipe, and will close on a reduction of such pressure consequent upon a lifting of the bows of the vessel from the water.

The invention will now be described further, by way of example only, with reference to the accompanying drawings in which:

FIG. 3 is a diagrammatic representation, partly in section, of a preferred arrangement;

FIG. 3a is a fragmentary view, in section, of the slide valve 28 in vent position for venting pressure from switch 29;

FIG. 3b is a view similar to FIG. 3a of valve 28 in position to pressurize switch 29;

FIG. 4 is a view corresponding to FIG. 3 of modified arrangement; and

FIG. 4a is an enlarged fragmentary view, in section, of the arrangement for operating directly on switch 29 with rod 27;

FIG. 5 is a diagrammatic section of a deflection gauge as applied to a ships bottom plate for use, in conjunction with the present invention.

Figure 1:
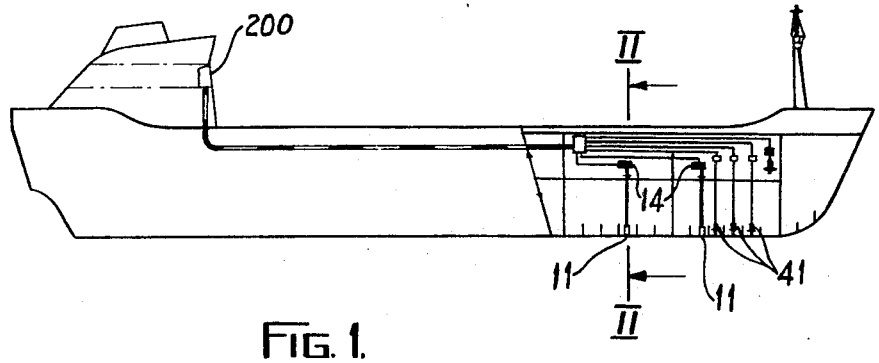
FIG. 1 is a diagrammatic side elevation showing the location of the slamming indicator installation of the present invention on a container ship.
Figure 2:
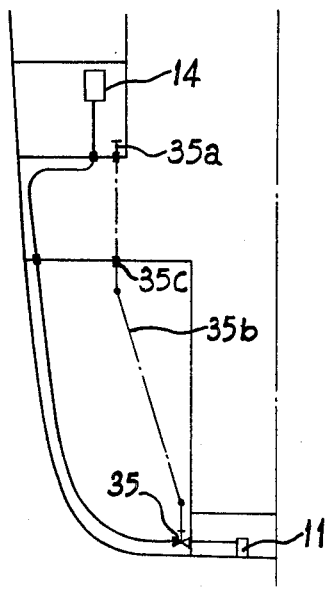
FIG. 2 is a section on line II—II of FIG. 1, drawn to a larger scale.

Referring now to the drawing, and particularly to FIGS. 1 to 3 thereof, a slamming indicator comprises a stack pipe 11 located within the ships double bottom and open to the sea through a hole 12 in the bottom plating 13, a sensing unit 14 sensitive to air pressure within the stack pipe 11, and a warning indicator 15a controlled by the said unit 14 and arranged to give a visible or audible indication at a control panel 200 on the bridge, of presence within the stack pipe of an air pressure consistent with slamming conditions existing.

The stack pipe 11 is twenty-seven inches long and of four inches inside diameter, the outer end of the stack pipe being flush with the outer surface of the hull, and the inner end of the pipe is closed by a plate 16 secured transversely thereof, as by welding. A through hole 17 is provided in the wall of the stack pipe adjacent the inner end thereof, the said hold receiving a transfer pipe 18 into engagement therewith, an inclined baffle 19 being located within the stack pipe and in closely spaced disposition relative to the end of the transfer pipe to prevent direct passage of water into the transfer pipe on slamming. The transfer pipe is of three quarter inch bore and the baffle, which baffle extends across the tube, is two inches wide and one quarter inch thick. The length of the stack pipe and the axial location of the transfer pipe thereon are such that the latter lies slightly above the normal water level within the stack pipe with the ship fully laden, the inclined baffle likewise being disposed above the water level.

The sensing unit 14 consists of a closed chamber defined by upper and lower flanged body parts 20, 21, an apertured plate 22 being arranged transversely of the said parts and being clamped at its periphery between the flanges thereof. The plate 22 divides the chamber into upper and lower chambers 23, 24, the lower such chamber being connected with the stack pipe 11 via the transfer pipe 18 and the upper such chamber being connected with a source of pressure air via feed pipe 25.

A flexible diaphragm 26 is disposed transversely of the lower chamber 24 and at the underside of the apertured plate 22, the periphery of the said diaphragm being clamped between the flange of the lower body part 21 and the plate 22 and the diaphragm being secured to the stem 27 of a slide valve 28, such valve 28 controlling the passage of low pressure air into a pressure switch 29 in the electrical circuit of an indicator lamp of the indicator means.

Feed pipe 25 includes a high pressure regulator 30 and a low pressure regulator 31 each in series therewith, pressure gauges 32, 33 being provided for regulators 30, 31 respectively, and a branch 25a of the said feed pipe is connected with the lower chamber 24 through a gate valve 34, the branch pipe 25a and gate valve 34, which latter is normally closed, being provided for a purging purpose hereafter to be made apparent.

Transfer pipe 18 has a gate valve 35 serving to isolate the sensing unit 14 from the stack pipe as required, and a two-way selector valve 36 is provided in such pipe intermediate the gate valve and chamber. The selector valve is used for test purposes and serves to provide a means of checking the serviceability of the equipment, by connecting the lower chamber 24 selectively to the stack pipe 11 and to the atmosphere. Actuation of the valve 35 is by way of a handwheel control 35a operating on the valve through an extended spindle 35b, such spindle passing through suitable glands 35c in the ship structure.

In use the air pressure with the stack pipe 11 is monitored, and such pressure serves to control the pressure switch 29 and hence the energization or otherwise of any indicator means in circuit therewith, as next to be described.

When the ships bottom leaves the water, any water within the stack pipe will be forced out by the air pressure above it and the air pressure within the stack pipe will fall to atmospheric, as will the pressure within the lower chamber 24. A pressure differential will exist at the two sides of the diaphragm, (the pressure within the upper chamber being of the order of 9 inches water gauge), and the diaphragm will move downwardly thereby moving the stem 27 of the slide valve to put the pressure switch in communication with the source of low pressure air. The pressure switch is set to operate at the pressure of the low pressure air, and hence the circuit of the indicator 15a, be it a light or audible warning, is energized.

As the ships bottom re-enters the water, so the air within the stack pipe is compressed and the pressure rises to return the diaphragm to its 'rest' position against the apertured plate. The return motion of the diaphragm adjusts the slide valve and isolates the pressure switch from the source of low pressure air, the air within the switch being released to atmosphere through a bleed pipe 37 and the switch then being opened.

If it is required to purge the stack pipe of mud or other obstruction, the gate valve 34 is opened so that pressure air is fed to the stack pipe via branch pipe 25a through the lower chamber 24 to the transfer pipe 18 and thence to the interior of the stack pipe.

The circuit of the indicator 15a may be provided with a counter 15b to provide a check on the number of instances at which the bows have lifted from the water to expose the under plating of the hull, and appropriate means may be provided to ascertain and to indicate the frequency of slamming or presence of slamming conditions The construction and operation of the sensing unit as shown in FIG. 3 may be modified, and indeed simplified, if desired, and a modified arrangement is shown diagrammatically in FIG. 4 in which like references to those of FIG. 3 are used for the same or similar parts.

In the arrangement of FIG. 4, the diaphragm of the unit 14 serves mechanically to control an electrical switch through a control rod carried thereby, air at low pressure being applied to the underside of the diaphragm and to the space between such diaphragm and the water surface within the stack pipe through line 25'. The pressure within the space will increase beyond that of the line pressure, say 8 pounds per square inch, as the water level in the stack pipe rises and the switch will be so arranged as to be open at an air pressure within the space consistent with the bows being in the water. The pressure at which air if fed to the space is, however, not sufficient of itself to maintain the switch in an open condition and thus a lowering of the pressure such as would result from a lifting of the bows from the sea will close the switch and complete the electrical circuit of the indicator 15a.

The arrangements as aforesaid are concerned with detecting and indicating the pressure of slamming conditions, and it is intended that such arrangement be used as an advance warning that slamming might occur in order that appropriate preventative action might be taken to avoid slamming.

We propose to provide as a device complementary to that hereinbefore described, a means of measuring the actual permanent deformation introduced by slamming, such means being shown diagrammatically in FIG. 5, and consisting of a plate deflection gauge 41 mounted on a platform 42 arranged in spaced disposition relative to the ships bottom plate 13, the deflection gauge including a spring loaded plunger 43 disposed within a cylindrical holder 44 carried by and extending through the platform 42, the lower end of the plunger resting on the ships bottom plate and the upper end carrying a light rod 46 within which is embedded a soft iron slug (not shown). The slug lies within a coil 47 and is movable axially thereof on movement of the lower end of the plunger relative to the platform as on deformation. A switch 48 is provided on the holder, set to be actuated upon a predetermined deflection of the bottom plate. The coil 47 forms a part of an electrical circuit which further includes a meter 49 on the panel 20 at the control point, and variations in inductance consequent upon deformation are manifested as readings on the meter.

The switch 48 is set to operate upon deflection of the bottom plate to a predetermined extent, a resilient deformation giving rise to a temporary illumination of a lamp 51 in circuit with the switch and a permanent deformation resulting in the lamp being continually illuminated. In practice the switch is set to operate on a 6 mm. deflection.

Movement of the slug within the coil varies its inductance, and the change in inductance is converted into a d.c. voltage which is proportional to the linear movement of the slug.

As an alternative to using a variable inductance transducer, we may prefer to utilize an hydraulic deflection gauge, the latter comprising a spring loaded piston in contact with the plate and moving within an hydraulic cylinder, movement of the piston displacing hydraulic fluid through narrow bore tubing, the displacement being indicated by a multi-tube manometer on the bridge.

The location of the stack pipe (or stack pipes) and of the plate deflection gauge (or gauges) is a matter of choice, it being understood that these will be in position at those parts of the hull normally subjected to slamming, and this will vary according to the route and the prevailing winds.

For ships sailing between the United Kingdom and the Eastern seaboard of North America we have found it convenient to provide stack pipes of the slamming indicator on the port side between frames 156 and 157 and between frames 172 and 173, whilst deflection gauges are provided on the keel strake between frames 170 and 171 and between frames 178 and 179, and on a strake between frames 174 and 175.

What I claim is:

1. Apparatus for automatically indicating the incidence of slamming of a ship in a body of water, the apparatus including an entrance port in communication with the sea at the ship's bottom at a forward position therein, an air-filled chamber in said ship in communication with said entrance port so that during normal sailing of the ship, sea water enters a lower portion of the chamber through said entrance port to increase the pressure of the said air therein, while under conditions of slamming, the sea water tends to withdraw from the said lower portion through said entrance port to decrease the said pressure, said chamber including an entrance sub-chamber located at the ship's bottom in communication with said entrance port and defining the lower portion of said air-filled chamber, a measurement sub-chamber in said ship remote from and upwards from said entrance sub-chamber, conduit means connecting said entrance sub-chamber with said measurement sub-chamber, a pressure responsive device in said measurement sub-chamber responsive to changes in pressure of the air therein incident to the occurrence of a slamming condition, and indicating means responsive to said pressure responsive device to actuate an alarm when the pressure falls below a predetermined value corresponding to the incidence of slamming.

2. Apparatus according to claim 1, wherein the entrance sub-chamber comprises a vertically extending pipe of which the lower end comprises the entrance port and of which the upper end is connected to the said conduit at a position which lies above the highest level that the free surface of the sea water in the said lower portion reaches within the pipe during the said normal sailing of the ship when fully laden.

3. Apparatus according to claim 2, wherein a baffle is mounted within the pipe adjacent to the said connection, the baffle lying above the said highest level of the free surface of water and serving to tend to prevent the passage of the sea water into the said conduit.

4. Apparatus according to claim 1, wherein the said conduit includes an ON/OFF valve.

5. Apparatus according to claim 1, wherein the said conduit includes a two-position test valve for connecting the measurement sub-chamber alternatively to the entrance sub-chamber or to the atmosphere.

6. Apparatus according to claim 1, wherein the pressure-responsive device comprises a movable member of which opposite sides are exposed respectively to the air within the measurement sub-chamber and to the atmosphere within an auxiliary chamber, the movable member being connected to an operating rod for operation of the indicating means.

7. Apparatus according to claim 6, wherein the auxiliary chamber is connected to a supply of air at a constant pressure.

8. Apparatus according to claim 6, wherein the movable member is a flexible diaphragm.

9. Apparatus according to claim 7, wherein a stop is provided for the diaphragm, within the auxiliary chamber.

10. Apparatus according to claim 6, wherein the operating rod is movable by the movable member to control the supply of air to a pressure-operated electrical switch.

11. Apparatus according to claim 6, wherein the operating rod is movable by the movable member to mechanically control the operation of an electrical switch.

12. Apparatus according to claim 1, wherein the air-filled chamber is connected via a normally closed valve to a source of air under pressure, for purging of the chamber.

13. Apparatus according to claim 1, wherein the air-filled chamber is permanently connected to a supply of air at a pressure insufficient of itself to prevent the said actuation of the alarm upon the incidence of slamming.

14. Apparatus for automatically indicating the incidence of slamming of a ship in a body of water, comprising port means located in the bottom of said ship at a forward portion thereof and in open communication through the bottom of the ship with said body of water, an air-filled chamber in the ship normally in fluid communication with said port means, said air-filled chamber including an entrance chamber in the ships bottom in communication with the entrance port and a measurement chamber remote from and upwards from said entrance chamber, conduit means connecting said entrance chamber with said measurement chamber, movable means in said measurement chamber responsive to changes in pressure of fluid in said port means incident to the occurrence of a slamming condition, pressure responsive switch means controlled in response to movement of said movable means, said movable means connected with valve means to control the flow of air to said switch means to operate said switch means upon the occurrence of a slamming condition of said ship in said body of water, and indicating means connected with said switch means and controlled thereby to indicate the incidence of slamming of said ship in said body of water.

15. Apparatus as in claim 14, wherein an actuating rod is connected with said movable means and with said switch to directly operate said switch upon movement of said movable means.

* * * * *